United States Patent
Garfield et al.

[19]

[11] Patent Number: 5,938,385
[45] Date of Patent: Aug. 17, 1999

[54] NESTED SOLID, SOLID WALL ANCHOR

[76] Inventors: Nathaniel H. Garfield, 8 Sunset La., Harrison, N.Y. 10528; Gordon E. Kaye, Bear Mountain Bridge Rd., Box 398, Garrison, N.Y. 10524

[21] Appl. No.: 09/084,034

[22] Filed: May 22, 1998

[51] Int. Cl.$^6$ .................................................. F16B 13/06
[52] U.S. Cl. .......................................... 411/80.5; 411/60.2
[58] Field of Search ........................... 411/55, 57.1, 60.1, 411/60.2, 60.3, 80.5, 80.6

[56] References Cited

U.S. PATENT DOCUMENTS

| | | | |
|---|---|---|---|
| 919,205 | 4/1909 | Newhall | 411/60 |
| 1,021,390 | 3/1912 | Wagner | 411/57 |
| 3,413,887 | 12/1968 | Von Wolff | 411/60 |
| 4,142,440 | 3/1979 | Schafer | 411/57 |
| 4,752,170 | 6/1988 | McSherry | 411/60 |

FOREIGN PATENT DOCUMENTS

| | | | |
|---|---|---|---|
| 361124 | 11/1938 | Italy | 411/60 |
| 1309391 | 3/1973 | United Kingdom | 411/55 |
| 2136525 | 9/1984 | United Kingdom | 411/57 |

*Primary Examiner*—Flemming Saether
*Attorney, Agent, or Firm*—Graham & James LLP

[57] ABSTRACT

A solid wall plug-type anchor comprised of a molded extrudible plastic material comprises a central hinge section and at least two extension members longitudinally extending from the hinge section. The hinge section permits the extension members to be hingedly moved into engaging nested juxtaposition with each other with nesting of integrally formed depressions and elevations in the engaging surfaces of the extension members. The nested structure comprises a solid, solid-wall elongated anchor with the hinge section at one end of the anchor and with the juxtaposed free ends of the extension members comprising another end of the anchor. The extension members each further comprises a plurality of small, non-contiguous wells which remain open within the nested extension members but which wells are not externally exposed. The wells provide stress relief for the anchor when a large screw or bolt is longitudinally inserted therein by providing a measured initial accommodation of extruded plastic during the screw insertion into a substantially solid interface between the extension members. The free ends of the extension members form a cavity for initial guided insertion of the screw or bolt.

10 Claims, 3 Drawing Sheets

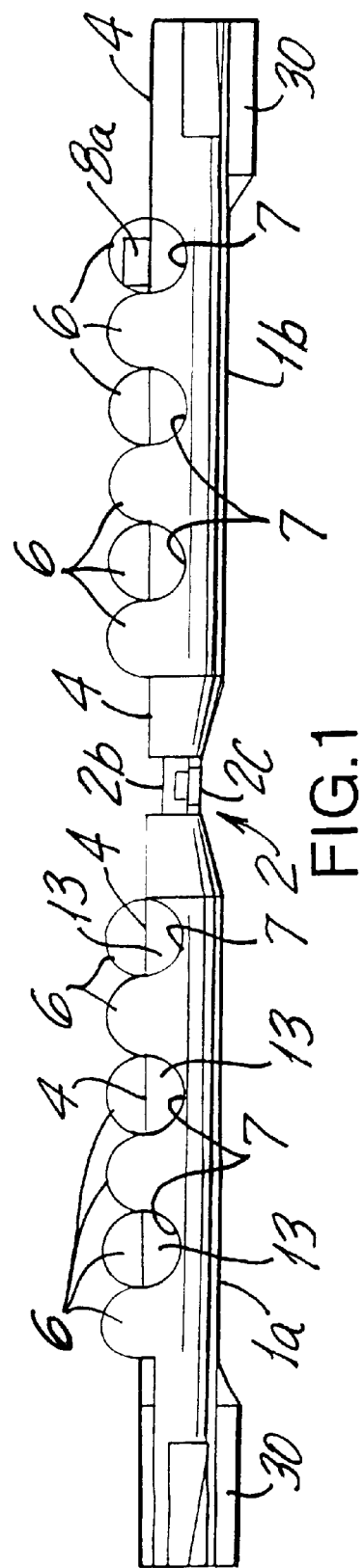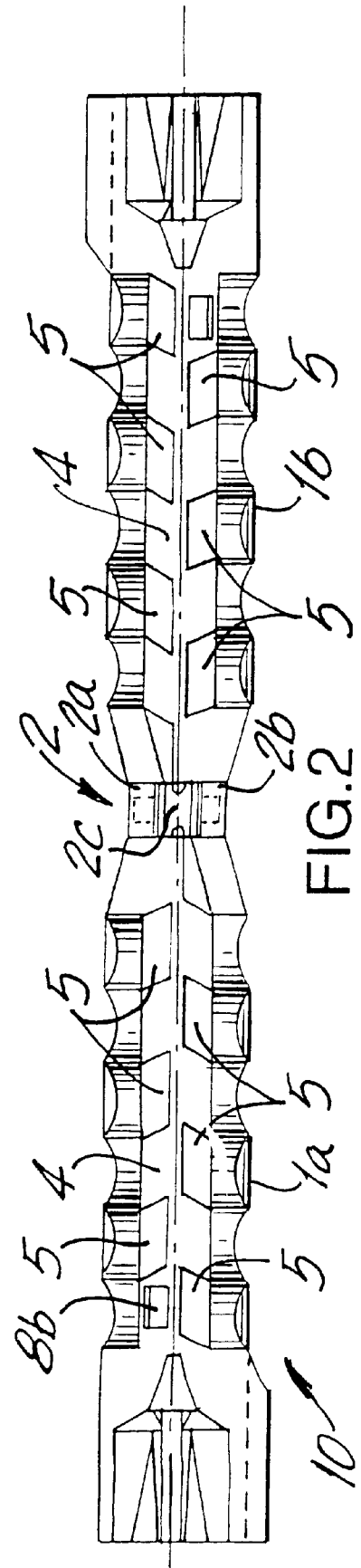

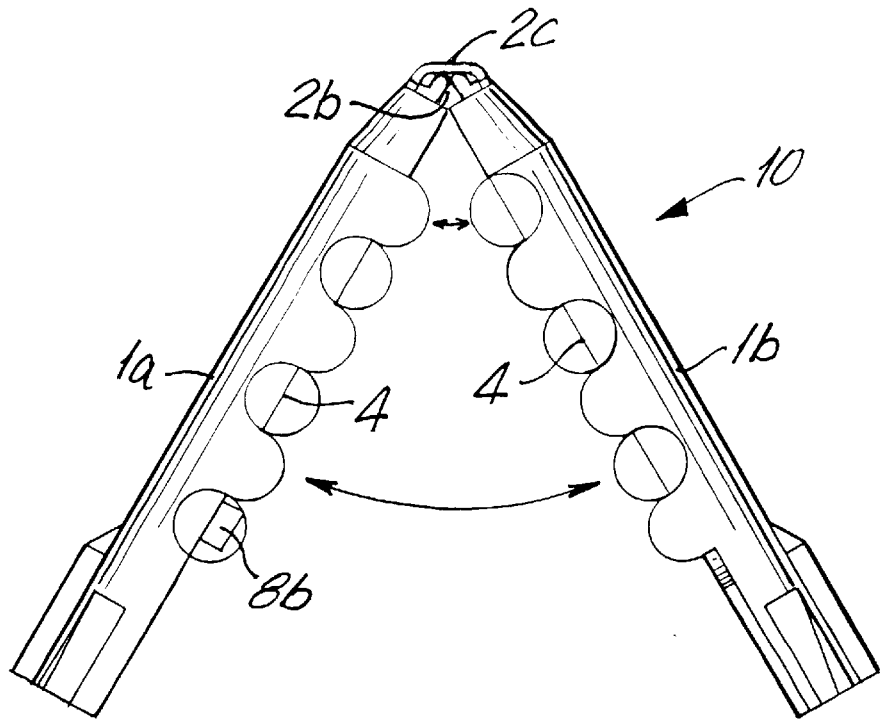
FIG.3
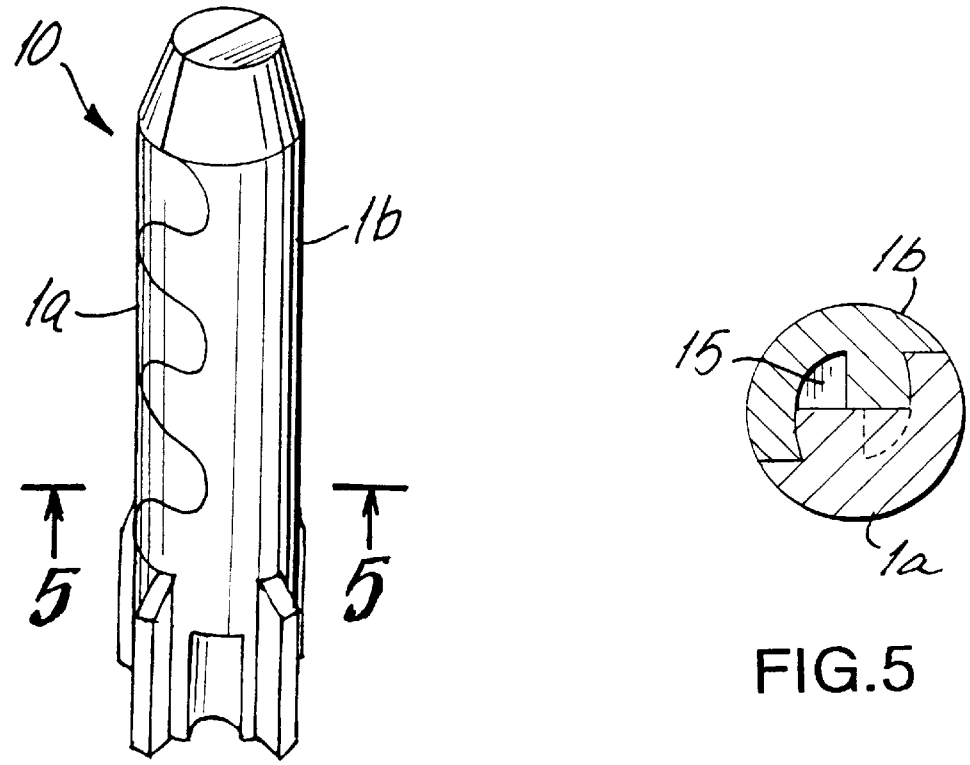
FIG.4
FIG.5

NESTED SOLID, SOLID WALL ANCHOR

FIELD OF THE INVENTION

This invention relates to anchors for use with solid walls and particularly to plastic plug type anchors which are utilized by insertion therein of screws which expand the anchor against the walls of an insertion hole.

BACKGROUND OF THE INVENTION

A common method for affixing items to solid walls is to drill a hole of measured depth and diameter in the wall and to insert an expansion anchor into the hole, expanding the anchor to thereby hold a supported item. A common form of inexpensive expansion anchor is the plastic plug anchor (generally of a relatively hard plastic such as nylon or pvc) of suitable snug fitting size which is inserted into the drilled hole. A screw is screwed into the open end of the plug to cause the plastic of the anchor to expand against the walls of the hole (less desirable is a plug anchor in which a nail is hammered into the plug). The item to be supported by the wall is held by the screw and kept in place by the anchor. Holding is effected by an increase of frictional engagement between the plastic plug and the walls of the hole caused by the screw. The plug anchor is provided with a central hollow for accommodation of the screw without lockup during installation.

In a more recently developed plug anchor, as disclosed in U.S. Pat. No. 4,752,170, an extrudible material such as polypropylene is used in place of the more common nylon or pvc and the anchor is configured to have nesting arms which, when nested, form a completely or substantially completely solid anchor body for a significant portion of the length of the anchor. In U.S. Pat. No. 5,161,296, a method of using the aforementioned nested anchor is described wherein the essentially solid nature of the anchor is utilized to effect, with screws or bolts of dimension matched to the anchor, extraordinary tensile holding strength. The disclosures of both of the above patents are incorporated herein by reference thereto.

SUMMARY OF THE INVENTION

It is an object of the present invention to provide an improvement of the structure of the anchor described in U.S. Pat. No. 4,752,170 whereby it is easier to mold and whereby holding strength is increased.

It is a further object of the present invention to provide the anchor with stress relief means which enhances rather than decreases holding strength.

Generally the present invention comprises a solid wall anchor comprised of a molded extrudible plastic material comprising at least two elongated and preferably identically shaped members which are configured on respective surfaces thereof to be nestable with each other to form a generally cylindrical anchor device. The members may be completely separated but are more preferably connected by a central hinge section comprised of connecting strips and are unitarily molded therewith to facilitate handling and initial molding. In the preferred embodiment at least two extension members laterally extend from the hinge section, with the hinge section being adapted to permit the extension members to be initially held as a rigid unit but allowing the extension members to be hingedly moved toward each other into engaging nested juxtaposition with each other. Nesting is effected by means of integrally formed depressions and elevations in the engaging surfaces of the extension members. The engaged and nested structure comprises an elongated generally cylindrical shaped anchor with the hinge section at one end of the anchor and with the juxtaposed free ends of the extension members comprising another end of the anchor. The extension members each further comprises a plurality of small, non-contiguous wells which remain open within the nested extension members but which wells are not externally exposed. The wells provide stress relief for the anchor when a large screw or bolt is longitudinally inserted therein by providing a measured initial accommodation of extruded plastic during the screw insertion into a substantially solid interface between the extension members. The free ends of the extension members form a cavity for initial guided insertion of the screw or bolt.

These and other objects, features and advantages of the present invention will become more evident from the following discussion and drawings in which:

SHORT DESCRIPTION OF THE DRAWINGS

FIG. 1 is a side view of the anchor of the present invention as taken from the mold and prior to nesting of elements;

FIG. 2 is a top view of the anchor of FIG. 1;

FIG. 3 is a side view of the elongated members of the anchor being hinged together for nesting;

FIG. 4 is a view of the anchor with members nested and configured for use;

FIG. 5 is a cross section view of FIG. 4 taken along line 5—5;

DETAILED DESCRIPTION OF THE INVENTION

Figure 6:
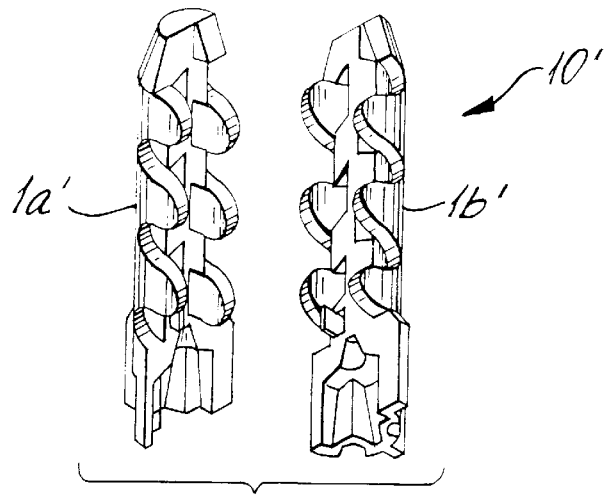
FIG. 6 shows the nesting and formation of the anchor from separate (not hinged together) extension members in a modified embodiment of the present invention.

In a preferred embodiment the extension members are identical and are each provided with laterally placed (relative to the central longitudinal axis thereof) protrusions and depressions. The protrusions and depression are located peripherally along the edges of a generally flat surface adapted for juxtaposition with another extension member and are configured to effect the nesting and formation of the anchor device, whereby the protrusions and depressions are configured to nestingly mate with depressions and protrusions of another extension member. At the same time the flat surfaces within the outer periphery of protrusions and depressions of the respective extension members are brought into close proximity to form a substantially solid cylindrical anchor. In accordance with the present invention non-contiguous wells are provided in the flat surfaces laterally adjacent the protrusions. These wells are further rhomboidal in shape and serve to help in properly directing an inserted screw and also serve to initially accommodate material of the anchor which has been displaced and extruded by the inserted screw, for initial stress relief when an overlarge screw such as described in U.S. Pat. No. 5,161,296 is utilized.

In the preferred embodiment wherein the extension members are fixed into relative position with a connecting hinge, proper nesting and mating of protrusions and depressions is readily effected by hinging the extension members together until engagement. If the extension members are separate elements they are laterally brought together to effect the nesting.

The hinge serves the purpose of enabling the extension members to be handled as a unit and to hold the members in place for nesting. In a further preferred embodiment the hinge is comprised of a plurality of connecting strips which are not aligned in a single plane, wherein the extension members can be handled as a single longitudinal unit without premature bending. The anchor material such as polypropylene accommodates the stretching necessary to align the strips during the actual hinging.

When the extension members are nested, the forward end of the anchor (i.e., the end initially inserted in the placement hole) is the hinging point. The other end, which remains accessible for insertion of the holding screw, is preferably configured to provide a partial cavity sufficient for initial guided insertion of the screw into the anchor. The anchors having the configuration as described, provide about a 25–30% increase over the anchors with the structure and method as used in the aforementioned patents.

DETAILED DESCRIPTION OF THE DRAWINGS AND THE PREFERRED EMBODIMENT

With reference to the drawings, in FIGS. 1 and 2, anchor 10 is shown as having been molded in the open non-nested configuration with extension members 1a and 1b. The extension members are hingedly attached by hinged section 2 comprised of straps 2a and 2b which are in one plane and strap 2c which is in a slightly offset plane. This offset hinge permits the extension members 1a and 1b to be more readily handled as a solid unit, prior to nesting. During nesting, as shown in FIGS. 3 and 4, strap 2c stretches slightly more to become aligned with straps 2a and 2b.

Each of the extension members is provided with protrusions 6 and depressions 7 which are configured for interfitting with corresponding depressions 7 and protrusions 6 in the other of the extension members, with juxtaposition of flat surfaces 4 of the respective extension members, as is more clearly seen in FIGS. 3 and 4. It is noted that, as shown, extension members 1a and 1b are interchangeable with each other if separated as shown in the embodiment of FIG. 6.

As seen in FIG. 2, flat surface 4 of each of the extension members is provided with numerous centrally located wells 5 which are staggered and non-contiguous and are each internally positioned adjacent a protrusion 6. The wells 5 are slightly removed from the longitudinal axis L and are configured in the shape of rhomboids directed toward the forward end of the anchor and in the direction of insertion of screw 20 (shown in FIG. 7) for the facilitated insertion of the screw and the continued take up of polypropylene extruded by movement of the screw. The wells are dimensioned to accept some but not all of the extruded polypropylene during the screw insertion. Staggering of the wells 5 results in the absence of a through hole along the internal length of the anchor 10. The center 15 of the anchor remains continuously solid throughout its length (see FIG. 5). Elongated posts 8a and 8b, adjacent initial wells 5, at the screw entry point, as shown in FIGS. 1,2,3 and 5, co-fit into wells 5 of the opposite extension members 1a and 1b, thereby providing an initial solid center.

It has been discovered that the molding of the anchor in either hinged or separated extension member form, results in the protrusions shrinking slightly during the molding process. This causes the protrusions to lean inwardly to effectively form an engaging undercut which is utilized for engagement of the protrusions 6, during nesting, with surfaces 13 adjacent the depressions 7. This advantageously causes the extension members to remain nested and interlocked with each other for immediate use in an insertion hole.

As shown in FIG. 6, anchoring elements 1a' and 1b' of anchor 10' are identical and separated with mirror image interfitting of the elements. Anchoring elements 1a' and 1b' are also identical to members 1a and 1b of FIGS. 1–5 but without the hinge section 20.

Figure 7:
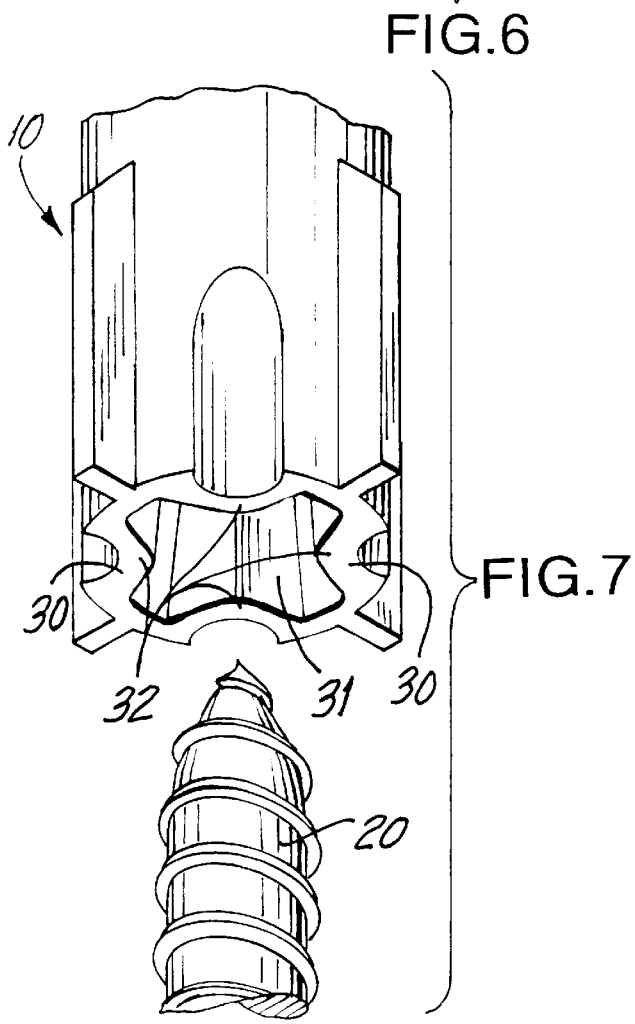
FIG. 7 is a bottom isometric view of the nested anchor (either embodiment) showing the guiding end entry path for a screw or lag bolt.
Figure 8:
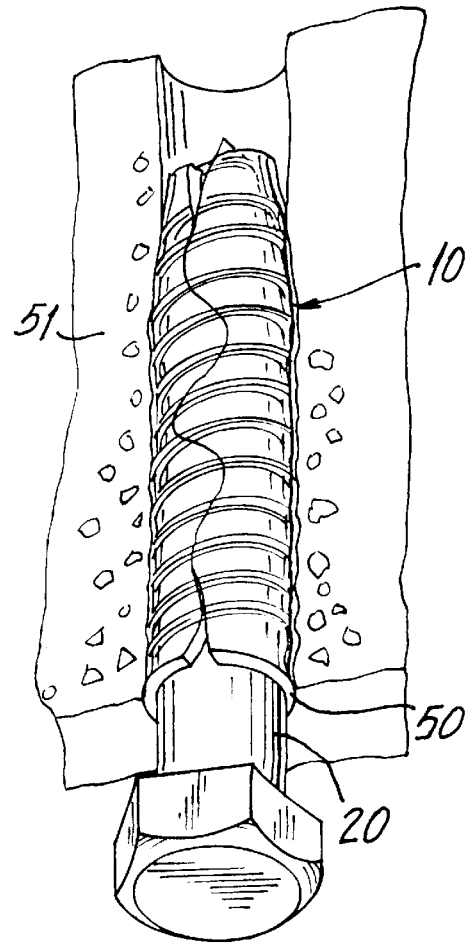
FIG. 8 is a cross section view of the anchor (either embodiment) as installed in a solid substrate.

As is more clearly seen in FIG. 7, the outer ends 30 of the extension members 1a and 1b are configured to form a hollow 31 when the extension members are nested. The hollow 31 is provided with circumferentially symmetrically disposed raised sections 32 which form, internally of the hollow, a tapered guide path toward the interior of the anchor for guided insertion of the screw 20, without skewing and with evenly distributed holding forces, as shown in FIG. 8, wherein lag bolt 20 is shown as being centered within the length of the anchor 10 in aperture 50 in concrete wall 51.

It is understood that the above description of the preferred embodiment and the drawings are merely illustrative of the present invention and that changes may be made to the structure, configuration and materials of the anchor of the present invention without departing from the present invention as defined in the following claims.

What is claimed is:

1. A solid wall anchor comprised of a molded extrudible plastic material and comprising at least two elongated extension members which are configured on respective engaging surfaces thereof to be nestable with each other to form a generally cylindrical anchor device which is adapted to be longitudinally inserted in an aperture in a substrate and thereafter expanded within the substrate by a screw member, with said nesting being effected by means of integrally formed depressions and elevations in the engaging surfaces of the extension members, wherein the extension members each further comprises a plurality of small, non-contiguous wells along a substantial portion of the length of the nested extension members, which wells remain open within the nested extension members but which wells are not externally exposed.

2. The anchor of claim 1 wherein the extension members are hingedly attached to each other by hinging means at a point of the anchor which is initially inserted into said aperture.

3. The anchor of claim 2, therein the hinging means comprises at least two connecting strap members axially offset from each other wherein the extension members are adapted to be rigidly handled thereby as a unit and wherein the straps yieldingly hinge to permit the extension members to be nested with each other.

4. The anchor of claim 1, wherein the extension members are fully separated from each other prior to the nesting with each other.

5. The anchor of claim 1 wherein the extension members are adapted to form an entry hollow at an end of the nested extension members for the guided insertion of the screw member therein and wherein one or more protrusions formed in the walls of the entry hollow concentrically narrow the hollow to guide central disposition of the screw member into the remainder of the anchor.

6. The anchor of claim 1, wherein the extension members comprise means for maintaining said nesting during insertion of the anchor into the aperture.

7. The anchor of claim 6, wherein the means for maintaining said nesting comprises the molding and shrinkage of the protrusions whereby each protrusion leans axially inwardly for frictional engagement with a wall of a depression into which it is nested.

8. A solid wall anchor comprised of a molded extrudible plastic material and comprising at least two elongated extension members which are configured on respective engaging surfaces thereof to be nestable with each other to form a generally cylindrical anchor device which is adapted to be longitudinally inserted in an aperture in a substrate and thereafter expanded within the substrate by a screw member, with said nesting being effected by means of integrally formed depressions and elevations in the engaging surfaces of the extension members, wherein the extension members each further comprises a plurality of small, non-contiguous wells along a substantial portion of the length of the nested extension members, which wells remain open within the nested extension members but which wells are not externally exposed; wherein the wells are rhomboidal in shape with each being positioned between and axially adjacent a protrusion and depression and directly adjacent the protrusion whereby the wells are discontinuous from each other and axially staggered along the longitudinal axis of the anchor and wherein the rhomboids have forward ends pointing to the forward end of the anchor, adapted to be initially inserted in the aperture of the substrate.

9. A solid wall anchor comprised of a molded extrudible plastic material and comprising at least two elongated extension members which are configured on respective engaging surfaces thereof to be nestable with each other to form a generally cylindrical anchor device which is adapted to be longitudinally inserted in an aperture in a substrate and thereafter expanded within the substrate by a screw member, with said nesting being effected by means of integrally formed depressions and elevations in the engaging surfaces of the extension members, wherein the extension members each further comprises a plurality of small, non-contiguous wells along a substantial portion of the length of the nested extension members, which wells remain open within the nested extension members but which wells are not externally exposed; wherein the wells are all axially offset from the longitudinal axis whereby the anchor is longitudinally solid along said axis.

10. A solid wall anchor comprised of a molded extrudible plastic material and comprising at least two elongated extension members which are configured on respective engaging surfaces thereof to be nestable with each other to form a generally cylindrical anchor device which is adapted to be longitudinally inserted in an aperture in a substrate and thereafter expanded within the substrate by a screw member, with said, nesting being effected by means of integrally formed depressions and elevations in the engaging surfaces of the extension members, wherein the extension members each further comprises a plurality of small, non-contiguous wells along a substantial portion of the length of the nested extension members, which wells are positioned on laterally opposite sides of a longitudinal axis of each of said extension members respectively, which wells remain open within the nested extension members but which wells are not externally exposed.

* * * * *